United States Patent [19]

Goode

[11] Patent Number: 4,953,185
[45] Date of Patent: Aug. 28, 1990

[54] CLOCK RECOVERY AND HOLD CIRCUIT FOR DIGITAL TDM MOBILE RADIO

[75] Inventor: Steven H. Goode, Palatine, Ill.

[73] Assignee: Motorola Inc., Schaumburg, Ill.

[21] Appl. No.: 255,576

[22] Filed: Oct. 5, 1988

[51] Int. Cl.$^5$ .............................................. H04L 7/00
[52] U.S. Cl. .................................. 375/106; 375/120
[58] Field of Search .................. 375/7, 8, 106, 107, 375/108, 118, 120; 370/100, 103, 104; 328/63, 72; 307/527

[56] References Cited

U.S. PATENT DOCUMENTS

| | | | |
|---|---|---|---|
| 3,729,688 | 4/1973 | Cerny, Jr. et al. | 331/1 A |
| 3,983,498 | 9/1976 | Malek | 328/155 |
| 4,166,979 | 9/1979 | Waggener | 375/120 |
| 4,310,804 | 1/1982 | Ryon | 331/1 A |
| 4,400,817 | 8/1983 | Sumner | 375/119 |
| 4,450,573 | 5/1984 | Noble | 375/104 |
| 4,513,429 | 4/1985 | Roeder | 375/120 |
| 4,546,394 | 10/1985 | Yamamoto | 375/118 |
| 4,574,243 | 3/1986 | Levine | 328/155 |
| 4,592,076 | 5/1986 | El-Banna | 375/108 |
| 4,595,927 | 6/1986 | Menick | 343/390 |
| 4,596,046 | 6/1986 | Richardson et al. | 455/260 |
| 4,613,979 | 9/1986 | Kent | 375/108 |
| 4,663,769 | 5/1987 | Krinock | 375/110 |
| 4,667,333 | 5/1987 | Butcher | 375/106 |
| 4,733,404 | 3/1988 | Ostoich | 375/119 |
| 4,742,514 | 5/1988 | Goode et al. | 370/109 |
| 4,774,708 | 9/1988 | Hotta | 370/104 |
| 4,796,278 | 1/1989 | Naka | 375/108 |

OTHER PUBLICATIONS

Gardner, F. M., *Phaselock Techniques*, 2nd Edition, (New York: John Wiley & Sons, 1979), pp. 131–134.
Lindsey, W. C., and Simon, M. K., *Telecommunication Systems Engineering*, (New Jersey: Prentice-Hall, Inc. 1973), pp. 56–62.
Motorola MC14046B phase-locked loop CMOS/NMOS data sheet, pp. 6–13 to 6–17.
Simon, M. K. and Wang, C. C., "Bit Synchronization of Differentially Detected MSK and GMSK" *IEEE International Conference on Communications*, vol. 2, (Jun. 23–26, 1985), pp. 583–590.

*Primary Examiner*—Douglas W. Olms
*Assistant Examiner*—Stephen Chin
*Attorney, Agent, or Firm*—Darleen J. Stockley

[57] ABSTRACT

A clock recovery circuit for a digital TDM mobile radio transceiver is disclosed. In the "acquisition mode", a first phase-locked loop is configured to acquire synchronization with the input data signal, and a second phase-locked loop is coupled to the first PLL's output signal, thereby providing the recovered clock signal. The controller monitors the transmit control line and the received signal strength so as to switch the clock recovery circuit into a second configuration during a TDM transmit burst or a received signal fade. In this "hold mode", the second PLL is configured to free-run within a specified tolerance, while the first PLL is coupled to the second PLL's output signal. The controller maintains this "hold" configuration until the received signal is again present, and until the first PLL again acquires synchronization to the input data signal. In this manner, the controller prevents the recovered clock signal from losing bit synchronization or phase synchronization during transmit bursts, during the transmit-to-receive synthesizer out-of-lock period, or during Rayleigh fades. The present invention is particularly adapted for use in a TDM system utilizing 0.2 GMSK modulation, wherein there is less apparent clock signal available for clock recovery.

44 Claims, 3 Drawing Sheets

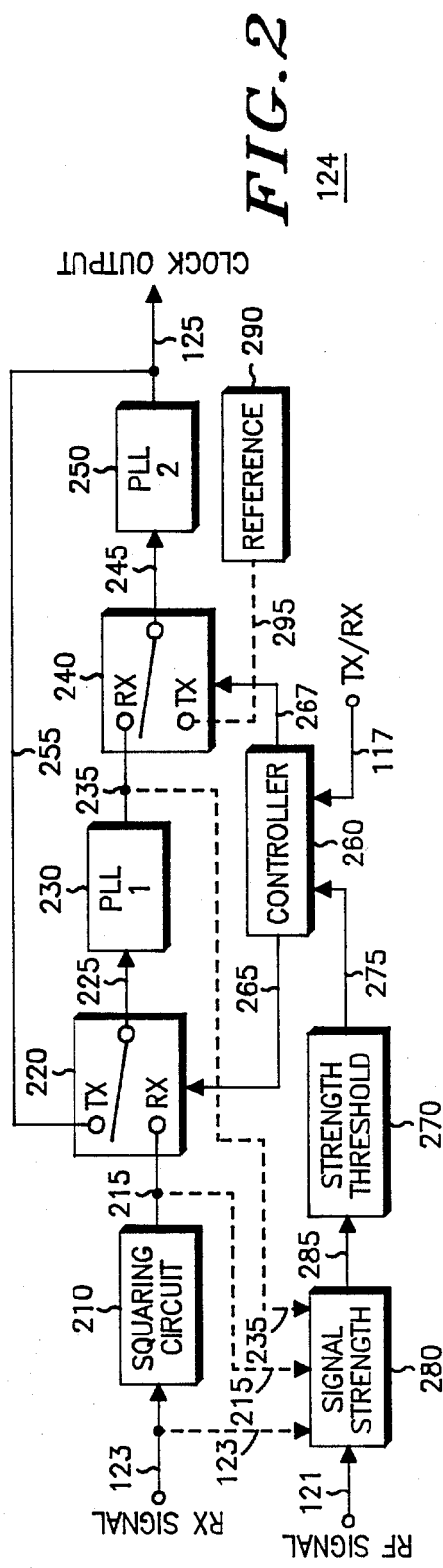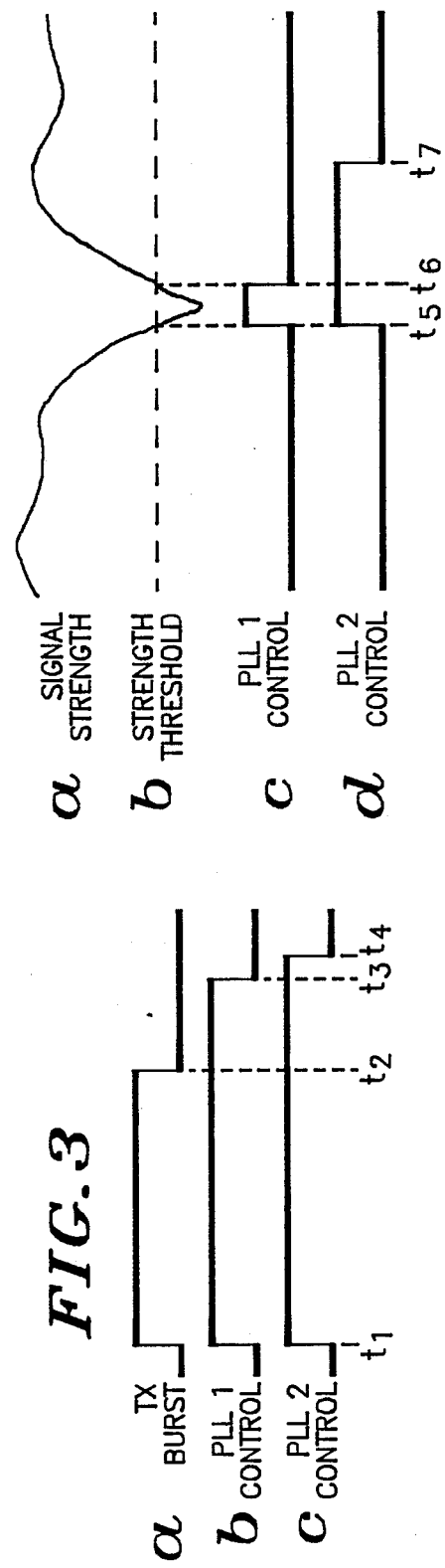

CLOCK RECOVERY AND HOLD CIRCUIT FOR DIGITAL TDM MOBILE RADIO

CROSS-REFERENCE TO RELATED APPLICATIONS

The present application incorporates by reference U.S. Pat. No. 4,742,514, entitled "Method and Apparatus for Controlling a TDM Communication Device", which is assigned to the same assignee as the present invention.

BACKGROUND OF THE INVENTION

This invention relates generally to the field of radio frequency (RF) communications, and, more specifically, to an improved technique for recovering the clock signal from a stream of digital data received by a mobile radio. The invention is particularly useful for mobile radios operating in a time division multiplexed (TDM) digital communication system having Gaussian Minimum Shift Keying (GMSK) modulation.

Recently, there has been an increased demand for digital voice, digitally-encrypted voice, and high-speed data communications over land mobile radio channels. Since the radio frequency spectrum is inherently limited, one must devise new system concepts and organizational features to accommodate the increased demand for mobile and portable radio communication services. Time-division multiple access (TDMA) is one method of achieving more efficient spectrum utilization.

In its simplest form, a TDMA system is comprised of a transmitting base station capable of time-multiplexing messages from at least two users on a single RF channel, and one or more remote receiving stations capable of receiving at least one of the time-multiplexed messages. Typically, the receiving station would be a mobile or portable unit capable of transmitting a TDM message to the base station (or repeater station) on a second (or the same) RF channel. Refer to U.S. Pat. No. 4,742,514, entitled "Method and Apparatus for Controlling a TDM Communications Device", for further information regarding TDMA.

In a TDM system, like most digital communication systems, it is necessary to establish a clock rate in the receiving station that is continuously synchronized with the clock rate of the transmitting station in order to precisely recover the digital data. Continuous bit synchronization, as used herein, means that the number of bits into the transmission channel is equal to the number of bits recovered from the channel over a given time period. This requirement means that the frequency and phase of the receive clock signal must accurately track that of the transmit clock.

Bit synchronization over an RF transmission path is very difficult to maintain, primarily due to Rayleigh fading. Any method of continuous bit synchronization must withstand RF phase jumps, channel fading, drift between mobile and base station clocks, and bit slippage due to an out of lock phase-locked loop (PLL) at the mobile or base site. Moreover, the clock recovery mechanism must be sufficiently tolerant of noise such that it does not readily loose synchronization with the digital signal in the presence of random noise pulses.

An additional requirement of a clock recovery circuit for a simplex transceiver is that it maintain bit synchronization when no data message is being received, i.e., during the transmit time slot of a TDM system. Another very important requirement of a clock recovery circuit for a remote unit in a TDM system is that it should update the recovered clock phase information utilizing data from the other TDM channels when the remote is transmitting. However, in many applications, this synchronization information may not be obtained from the synchronization (sync) word in the unused time slot, since the radio may not be able to change channels quickly enough to receive the sync word.

Hence, the ideal TDM mobile clock recovery circuit would have fast acquisition of the transmitted data message clock rate, update the clock phase information utilizing random data, and maintain synchronization during the mobile transmit time slot as well as through periods of signal fading.

Various methods have been used in the past to achieve synchronization of the mobile and base station clocks. One approach is to send the clock signal along with the data, while another approach is to encode the clock into each digit such that the message carries its own synchronizing information. These techniques are undesirable in RF communication systems, since the additional clock information requires either a wider bandwidth or a reduced data rate.

U.S. Pat. No. 4,592,076, entitled "Synchronizing Signal Recovery Circuit for Radio Telephones", utilizes a digital phase-locked loop to recover the clock rate in response to an appropriate bit rate timing signal derived from the data signal bit stream. This patent, however, assumes the data signal information is present at all times, which is not a valid assumption in a TDM system. Furthermore, the circuit would lose synchronization in periods of noisy or faded signals. Still further, in using a single PLL, the initial transmit-to-receive transient produced by the radio's frequency synthesizer may direct the clock recovery PLL away from the desired frequency, thus producing additional time when the receive clock is not synchronized with the transmit clock.

Another technique for clock recovery, described in U.S. Pat. No. 4,400,817 entitled "Method and Means of Clock Recovery in a Received Stream of Digital Data", utilizes a programmable divider coupled to a reference clock signal. The recovered clock signal is compared to the received data signal, and the divider is programmably altered to shift the phase of the recovered clock. Again, this phase comparison technique utilizing a zero-crossing detector which would not maintain synchronization during the transmit burst of a TDM mobile transceiver.

A need, therefore, exists to provide a method and means for clock recovery from a stream of digital data which provides continuous bit synchronization during periods when the mobile transceiver is transmitting, and also during fading periods when the received signal drops below receiver sensitivity.

SUMMARY OF THE INVENTION

Accordingly, it is an object of the present invention to provide an improved clock recovery circuit adapted for use in a digital TDM mobile radio system.

Another object of the present invention is to provide a TDM mobile radio transceiver which generates a clock signal which is in synchronization with a received data message, and which maintains synchronization during periods of time when the data message is not being received.

These and other objects are achieved by the present invention which, briefly described, is a clock recovery circuit for a digital TDM mobile radio transceiver which provides a clock signal from a recovered data signal and maintains synchronization through mobile transmitter bursts and received signal fades. This "holding" of the recovered clock phase of the remote unit during transmit and during receive fades is accomplished by the addition of a second phase-locked loop to the clock recovery circuit and intelligent switching between the two loops. The first loop is used to acquire synchronization with the received data signal, and the second loop is configured to either acquire synchronization to the first loop, or to free-run during periods of time when the first loop is not locked, i.e., during loss of signal conditions such as RF fades, or during periods of transmit in a simplex or TDM radio system. The present invention is particularly adapted to a TDM system utilizing 0.2 GMSK modulation, wherein there is less apparent clock signal available for clock recovery.

In accordance with the present invention, a signal conditioning circuit squares the received data message to produce a periodic received signal. Synchronization with this periodic received signal is acquired in a first phase-locked loop. A second phase-locked loop then acquires synchronization with the output of the first phase-locked loop to provide the clock output signal during periods when a received signal of sufficient strength is present. However, when the mobile transceiver is transmitting, the second PLL is switched to a fixed-frequency divide mode to produce the clock output, and the first PLL is locked to the second PLL output. This switching configuration keeps the first PLL close to the correct clock frequency. Tolerances of the second PLL in this "hold mode" are selected such that the clock output will not drift more than one-half bit during a TDM transmit burst. After the transmit burst, the controller of the clock recovery circuit monitors the incoming received signal strength so as to determine whether synchronization can again be acquired. When the first PLL has locked to the incoming data message of sufficient strength, the second PLL is re-locked to the first PLL's output. The result is that the recovered clock signal remains essentially phase-locked and in continuous bit synchronization with the incoming data message throughout the mobile transmit burst or a received signal fade.

In the preferred embodiment, the first PLL is an analog loop having a closed loop bandwidth wide enough to re-lock within one TDM transmit burst time frame, yet narrow enough to recover a clock signal near receiver sensitivity. The second PLL is a digital loop having a controlled stability to maintain one-half bit tolerance during the TDM transmit burst time frame. RF fades may be detected by monitoring either the magnitude of the RF signal, the noise content of the demodulated signal, the frequency or noise content of the squared data signal, or the lock detect output of the first PLL.

BRIEF DESCRIPTION OF THE DRAWINGS

The features of the present invention which are believed to be novel are set forth with particularity in the appended claims. The invention together with further objects and advantages thereof, may best be understood by reference to the following description taken in conjunction with the accompanying drawings, in the several figures of which like-referenced numerals identify like elements, and in which:

FIG. 2 is a detailed block diagram of the clock recovery circuit of FIG. 1;

FIG. 3 waveforms A–C represent timing diagrams illustrating output signals of the clock recovery controller during a TDM transmit, burst;

FIG. 4, waveforms A–D represent timing diagrams illustrating various signals of the clock recovery circuit during a received signal fade.

DETAILED DESCRIPTION OF THE PREFERRED EMBODIMENT

The TDM system of the preferred embodiment is comprised of a repeater station capable of time-multiplexing messages from at least two users, and a portable or mobile station for each user. As used herein, a mobile unit is defined as a radio transceiver typically carried in vehicles; a portable unit as typically carried about a person; and a base or repeater station unit as typically a permanent or semi-permanent installation at a fixed location. Mobile units and portable units are hereinafter collectively referred to as remote units. Although the present invention is primarily intended for use in a TDM digital voice radio communication system utilizing GMSK modulation, it is contemplated that the clock recovery technique of the present invention may be used in any radio system configuration.

Figure 1:
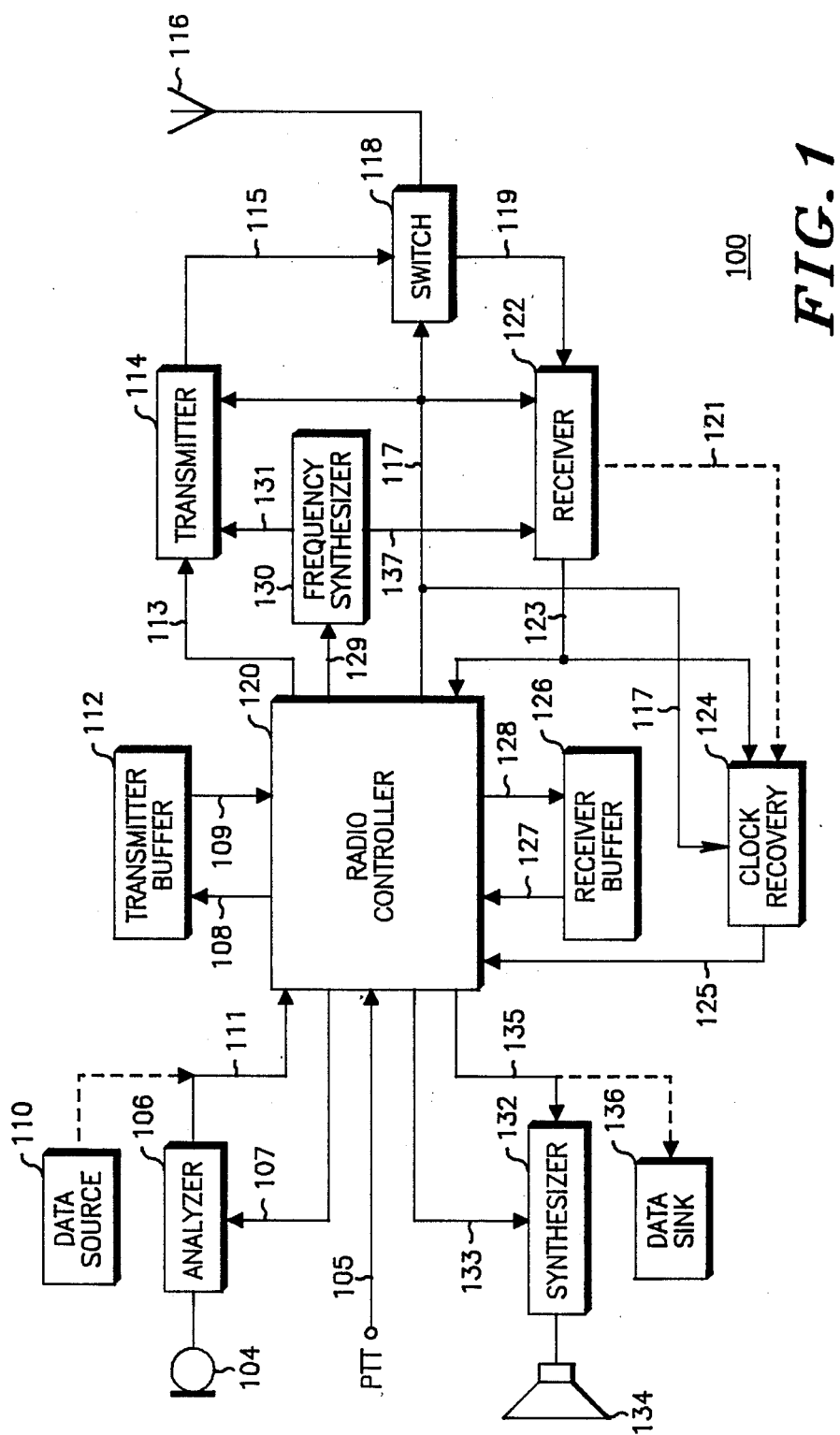
FIG. 1 is a general block diagram of a TDM radio transceiver illustrating the clock recovery technique according to the present invention.

Referring now to FIG. 1, there is shown a block diagram of remote radio transceiver 100. A speech signal is input from a user via microphone 104. The speech is analyzed by vocoder analyzer 106, which is enabled by radio controller 120 via connection 107. In the preferred embodiment, analyzer 106 is a sub-band coder, although any suitable voice coding technique may be used. Digital data information from data source 110 may also be transmitted in the same manner. Moreover, a combination of vocoded speech and data may alternately be transmitted as determined by a particular user.

Radio controller 120 inputs the vocoded speech or data, and routes it to transmit buffer 112 for storage via data line 108. Transmit buffer 112 is loaded at the vocoding data rate, such as, for example, 8.66 kilobits per second (kbps). When transmit buffer 112 has reached a predetermined capacity, the information is extracted by the radio controller via connection 109, added to signalling overhead data, and routed via line 113 to transmitter 114. PTT line 105 represents the push-to-talk switch of the microphone. Upon the reception of the PTT signal, controller 120 outputs a TX/RX control signal via line 117 to transmitter 114, receiver 122, and frequency synthesizer 130. During a transmit burst, the radio controller couples the transmitter output to antenna 116 via activating switch 118. Alternatively, switch 118 could be replaced with a duplexer or the like to continually couple the transmitter and receiver to the antenna.

To receive information from a TDM time slot, radio controller 120 couples antenna 116 to receiver 122 via switch 118. The demodulated received signal at 123 is then routed to radio controller 120 and clock recovery block 124. In various embodiments of the invention, a received signal strength indicator (RSSI) signal or perhaps the received RF signal itself is also coupled via line 121 to clock recovery block 124. (See below.) The recovered clock output at 125 is then coupled to radio controller 120 for use in synchronizing the controller to the received information.

When synchronized, controller 120 routes the received vocoded speech or digital data to receive buffer 126 via connection 128. This information is clocked into the received buffer at a suitable data rate, which typically is the transmission data rate. The information is subsequently extracted from receive buffer 126 via connection 127, and routed through the controller to vocoding synthesizer 132. This speech synthesizer, enabled by connection 133, operates on the essential speech components to synthesize the voice signal. The speech signal is then applied to speaker 134 to permit the received message to be heard by the operator. If, however, data was transmitted during the TDM slot, data sink 136, which may be a printer or monitor device, accepts the data and displays it for the user. Refer to U.S. Pat. No. 4,742,514 for a further description of radio transceiver 100 operation.

FIG. 2 illustrates in detail the individual blocks comprising clock recovery circuit 124 of FIG. 1. The received signal from the output of receiver 122, such as the demodulated output of an FM receiver discriminator, is applied via line 123 to squaring circuit 210. Squaring circuit 210 serves to generate a periodic signal from the incoming data message.

In the preferred embodiment, the received signal is a filtered non-return-to-zero (NRZ) data message. NRZ data is particularly difficult to synchronize to, since it consists of a random series of rectangular pulses wherein the transitions from a first level (representing a true value) to a second level (representing a false value) do not necessarily occur at the periodic clock rate. Filtering the NRZ data stream smoothes the transitions, thus reducing the required bandwidth of the data stream.

Squaring the incoming data message is a preferred method for recovering the clock signal from random NRZ data. Squaring the NRZ signal provides a single spectral line at the desired data rate. However, it is contemplated that any signal processing arrangement could be used which can provide a signal of sufficient periodicity for the phase-locked loop to acquire synchronization. For example, a zero-crossing detector could be used in a system employing Manchester data. In the preferred embodiment utilizing 18 kbps NRZ data, the squaring operation produces a spectral line at 18 kHz. Furthermore, in the preferred embodiment, the discriminator output 123 is low-pass filtered in the squaring circuit to remove the high frequency noise added by the receiver circuitry. A Motorola MC1596 multiplier integrator circuit is used to square the received data. The squared output is then band-pass filtered and output as the periodic received signal output 215. Refer to the article entitled "Bit Synchronization of Differentially Detected MSK and GMSK" by M. K. Simon and C. C. Wang, *IEEE International Conference on Communications*, Chicago, Ill., June 23-26, 1985, Vol. 2, pp. 583-90, for further information regarding this GMSK squaring technique.

In the receive mode, i.e., when the remote unit is receiving the TDM data message, clock recovery controller 260 instructs first switch 220 to couple the periodic received signal at 215 to PLL1, the first phase-locked loop 230, via line 225. The receive mode, or "acquisition mode", is illustrated in the Figure by switch position RX. PLL1 acquires synchronization with this periodic input signal to provide a first sync signal output at 235. Hence, the first PLL 230 is phase-locked to the incoming data message clock frequency. PLL1 outputs a noise-free periodic signal, and essentially provides a very narrow filter function for filtering the incoming periodic signal before applying it to PLL2. In the preferred embodiment, PLL1 is an analog phase-locked loop designed to have a closed loop bandwidth of 10 Hz. This bandwidth was selected to be wide enough to allow the loop to re-lock in a 120 millisecond (ms) TDM frame time, yet also be narrow enough to recover the clock signal near receiver sensitivity. A Motorola MC14046B CMOS phase-locked loop integrated circuit was used as PLL1 in the preferred embodiment. However, it is contemplated that other analog PLLs, a digital PLL, or even a narrowband bandpass filter/limiter network, may be used to perform the function of acquiring synchronization as performed by PLL1.

Controller 260 instructs second switch 240 to couple the first sync signal at 235 to the input of PLL2, the second phase-locked loop 250, at 245 in the receive mode. PLL2 acquires synchronization with the first sync output signal at 235, and outputs a second sync output signal at 125 as the recovered clock output. Hence, the second phase-locked loop is locked to the output of the first phase-locked loop, which itself is locked to the periodic received signal in the receive mode. In the preferred embodiment, a digital phase-locked loop is used for PLL2 such that the frequency tolerance of the PLL may be more accurately controlled when operating in its free-run fixed-frequency mode, as explained later. Again, however, PLL2 could also be an analog PLL. Refer to U.S. Pat. No. 3,983,498 for a representative digital phase-locked loop.

In the transmit mode, as indicated via TX/RX line 117, controller 260 changes the position of first switch 220 and second switch 240 to the transmit (TX) position via control lines 265 and 267. In the transmit or "hold" configuration, PLL2 is configured to free-run at a fixed-frequency. As long as the fixed-frequency drift of PLL2 is less than one-half bit over a TDM transmit frame, continuous bit synchronization can be maintained by recovering the phase of the clock during the next receive frame. If the tolerance is greater than one-half bit, then a bit slip could occur and the clock recovery circuit would not maintain continuous bit synchronization. A digital PLL used for PLL2 would simply be switched to a fixed-frequency divide mode to produce the clock output. If an analog loop were used, a stable frequency reference 290 would be coupled via line 295, through switch 240, to line 245. Reference 290 must be a phase-continuous reference, i.e. having no phase jitter, and must have a sufficiently narrow frequency tolerance so as to maintain synchronization during a TDM transmit burst or a received signal fade. Since the frequency tolerance of PLL2 in the fixed-divide mode (or of reference 290) are selected such that the clock will not drift more than one-half bit during a TDM transmit burst, the resulting clock output signal remains essentially phase-locked and continuously bit synchronized to the incoming clock signal throughout the mobile TDM transmit time.

The following is an example of the calculations used to determine the required oscillator stability for reference 290 or for a digital PLL operating in its free-run mode. Assuming that the TDM transmit burst time is 120 milliseconds, and the channel data rate is 18 kbps, then 2160 bits of information are transmitted during the transmit burst. To be within 0.5 bits of 2160 bits after the transmit burst, the reference must be within 0.5/2160 or 231 parts per million (ppm). Therefore, to maintain PLL2 within one-half bit after 120 ms, PLL2 must have a stability of 231 ppm or better. This calculation should be done for the worst case "hold" time expected in the system. This worst case hold time may be the transmit burst time or a maximum expected fade duration. At 800 MHz, 15 ms represents the maximum expected Rayleigh fade duration in the TDM system of the preferred embodiment.

Also in the transmit or hold configuration, first switch 220 couples the free-running clock output from 255 to the input of the first phase-locked loop at 225. PLL1 then acquires synchronization with the tight-tolerance free-running clock output, and serves to keep the first loop close to the correct clock frequency. This is done to reduce the re-lock time of PLL1 when the periodic received signal is again present.

When the radio switches from transmit to receive, controller 260 waits a predetermined time for the mobile transceiver frequency synthesizer to lock onto the receive frequency. After a sufficient time, i.e., when the synthesizer is deemed to be on frequency, the controller checks the received signal strength. If a strong received signal is present, PLL1 is again connected to the incoming periodic received signal when controller 260 changes the first switch to the RX position via line 265. In many applications, the controller may be directly coupled to a frequency synthesizer lock signal in order to determine this delay time period PLL2 remains in the fixed-divide or hold mode until PLL1 has had sufficient time to lock onto the incoming periodic signal (or actually does lock as could be indicated by its lock line). After PLL1 acquires synchronization, PLL2 is then re-locked to the output of PLL1 when controller 260 changes the position of switch 240 via line 267.

FIG. 3a represents a transmit burst of the mobile transceiver. At time $t_1$, the TX/RX line is activated until time $t_2$. In the preferred embodiment, the TDM system is configured such that the transmit burst duration $t_1-t_2$ is 120 ms.

FIG. 3b represents control signal 265 provided by controller 260 to first switch 220. At time $t_1$, switch 220 is changed from the RX to the TX position, since the radio frequency synthesizer has switched to its transmit frequency and that the received signal is lost. At time $t_2$, the synthesizer is switched back to the receive frequency, yet does not reach the correct frequency (within specified tolerances) until time $t_3$. In other words, the time delay $t_2-t_3$ is the lock time of the frequency synthesizer. In the preferred embodiment, the $t_2-t_3$ time period is approximately 40 ms. At time $t_3$, controller 260 monitors the received signal strength and, if sufficient, switches PLL1 to again acquire synchronization with the periodic received signal at 215. In some received signal strength detector embodiments, the controller could be programmed to switch PLL1 to the RX position before the signal strength is sufficient, e.g., if the particular signal strength detector monitors the output of PLL1. (See below.)

FIG. 3c represents control signal 267 to PLL2. At $t_1$, switch 240 is changed to the TX position such that PLL2 is in its fixed-divide mode. At $t_2$, the frequency synthesizer has not yet achieved the receive frequency. At $t_3$, PLL1 was switched the RX position, but it has not yet acquired synchronization with the periodic received signal. Hence, the controller waits until a time $t_4$ to switch PLL2 back to the receive mode. Thus, time delay $t_3-t_4$ represents the lock time of the first phase-locked loop 230. In the preferred embodiment, $t_3-t_4$ is approximately 5 ms.

As mentioned previously, another aspect of the present invention is that the clock recovery circuit maintains synchronization during periods of RF signal fading. Signal strength conditions can be monitored by controller 260 in various ways. The strength of the RF signal itself at 121 may be measured by signal strength block 280 and compared with a threshold in strength threshold block 270. Refer to the National Semiconductor LM3089 FM-IF data sheet for a representative received signal strength indicator (RSSI) circuit. Alternatively, the received signal 123 available at the discriminator may be measured and compared to a threshold. This embodiment of a signal strength circuit would operate in much the same way as a squelch circuit. U.S. Pat. No. 4,450,573 illustrates a representative data operated squelch circuit. The output of squaring circuit 210 may also be monitored via line 215 to provide an indication whether the periodic received signal carrier is present or is within a predetermined limit. Alternatively, the noise content of the periodic received signal could be measured. In still a different embodiment, an out-of-lock condition of PLL1 may be provided directly to the controller, or may be derived by measuring the frequency tolerance of its output at line 235. Refer to U.S. Pat. No. 4,574,243 for a representative lock detect circuit. In any case, line 275 serves to detect the loss of the periodic signal available to PLL1.

Referring now to FIGS. 4a and 4b, an appropriate signal strength measurement is compared to a signal strength threshold to detect a received signal fade. The threshold would typically be set at the receiver sensitivity such as, for example, 6.5 dB signal-to-noise ratio (SNR) for non-coherent GMSK.

FIG. 4c illustrates that control signal 265 to PLL1 changes switch 220 from the receive position to the transmit position at time $t_5$. When the fade is over, i.e., at $t_6$, PLL1 is switched back to lock to the incoming signal.

FIG. 4d illustrates that switch 240 changes PLL2 to its fixed-divide mode at $t_5$. When the fade has passed and the signal strength is again above the threshold, switch 220 is changed to allow PLL1 to try to lock to the received signal at $t_6$. However, depending on the duration of the fade, PLL1 may not acquire synchronization until after a certain amount of time. Therefore, the hold mode of PLL2 is maintained for the $t_6-t_7$ resync time delay. In the preferred embodiment, $t_6-t_7$ is approximately 15 ms. At $t_7$, PLL2 is again configured to acquire synchronization to the output of PLL1, which has now acquired synchronization with the incoming data message.

Figure 5:
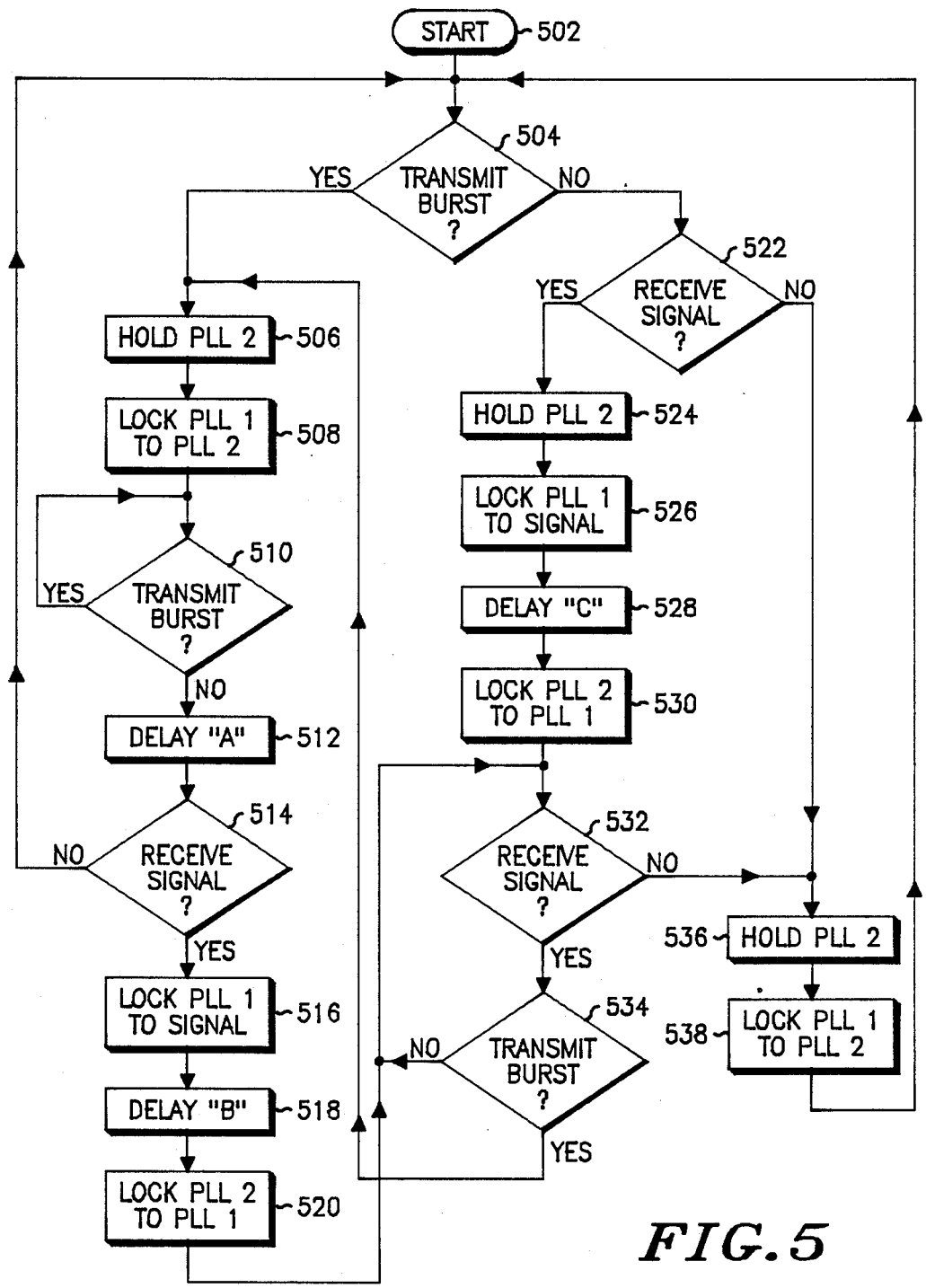
FIG. 5 is a flowchart illustrating the sequence of operations performed by the preferred embodiment of the clock recovery circuit controller.

The flowchart of FIG. 5 illustrates the complete sequence of events performed by controller 260 during both a mobile transmit burst and a received signal fade. Controller 260 could be a microprocessor, such as, for example, a Motorola MC6801, or dedicated hardware circuitry.

Beginning at Step 502, the controller checks TX/RX line 117 at Step 504 to see if a transmit burst has occurred. If yes, switch 240 is changed to the TX position in Step 506 to hold PLL2, and switch 220 is changed to the TX position in Step 508 to lock PLL1 to the output of PLL2. This change to the TX hold mode occurs at time $t_1$ of FIG. 3a. The duration of the TX burst is then monitored in Step 510. When the TX burst is over, which represents time $t_2$, the controller waits for the radio's frequency synthesizer to change channels. This wait time is represented by delay 'A' in Step 512.

After this delay, the received signal strength is checked in Step 514. If a received signal is not above the signal strength threshold, control returns to Step 504 to again check for a transmit burst. This would occur if the frequency synthesizer has not yet acquired lock, or if end of the TX burst happens to precisely coincide with a signal fade. If the received signal is strong enough, the controller locks PLL1 to the incoming periodic signal in Step 516 by changing switch 220 to the RX position. This would correspond to time $t_3$ of FIG. 3b. The controller then waits for a predetermined time, delay 'B' of Step 518, for PLL1 to acquire synchronization. At Step 520, corresponding to time $t_4$, switch 240 is changed to the receive position such that PLL2 is again locked to PLL1.

Control then proceeds to Step 532, wherein the controller again checks the received signal strength. If the received signal strength is sufficient, Step 534 again checks for a transmit burst. If no transmit burst has occurred, and the received signal strength is sufficient, controller 260 stays in the 532/534 loop monitoring for either a mobile transmit burst or a received signal fade.

Returning to Step 504, if a transmit burst was not indicated, then the received signal strength is checked in Step 522. If no received signal is present, then the controller switches PLL2 to its hold state in Step 536, and locks PLL1 to PLL2 in Step 538. These two steps, corresponding to time $t_5$ of FIG. 4, would also be taken if the received signal were not indicated at Step 532. Control would then return to Step 504.

If a received signal is present at Step 522, then the controller puts switch 240 in the TX position to ensure PLL2 is in the hold state at Step 524. Step 524 is necessary to ensure PLL2 remains in the hold state while PLL1 again acquires synchronization to the received signal. In Step 526, the controller switches PLL1 to the incoming signal, which corresponds to $t_6$ of FIG. 4c. At Step 528, the controller waits a delay "C" for PLL1 to lock, which corresponds to delay $t_6$-$t_7$ of FIG. 4d. PLL2 is subsequently locked to PLL1 in step 530, corresponding to time $t_7$. Control proceeds to Steps 532 and 534 to monitor for a drop in signal strength or the occurrence of a transmit burst.

The flowchart of FIG. 5 was configured such that three different delays A, B, and C, may be used at the appropriate times. It will be apparent to those skilled in the art that the flowchart could be simplified by implementing a single delay time for all three delays.

In review, an improved method and means for recovering a clock signal from a received data message has been shown. In the "acquisition mode", a first phase-locked loop is configured to acquire synchronization with the input data signal, and a second phase-locked loop is configured to acquire synchronization to the first PLL's output signal, thereby providing the recovered clock signal. The controller monitors the transmit control line and the received signal strength so as to transform the clock recovery circuit into a different configuration during a TDM transmit burst or a received signal fade. In the "hold mode", the second PLL is configured to free-run within a specified tolerance, while the first PLL is configured to acquire synchronization to the second PLL's output signal. The controller maintains this "hold" configuration until the received signal is again present, and until the first PLL again acquires synchronization to the input data signal. In this manner, the controller prevents the recovered clock signal from losing bit synchronization or phase synchronization during transmit bursts, during the transmit-to-receive synthesizer out-of-lock period, or during Rayleigh fades.

While only particular embodiments of the invention have been shown and described herein, it will be obvious that further modifications may be made without departing from the invention in its broader aspects. For example, analog or digital phase-locked loops may be used in either PLL position in accordance with the requirements of a particular application. Moreover, any simplex, duplex, or TDM radio system may utilize the techniques described herein. Accordingly, the claims are intended to cover all such changes and alternative constructions that fall within the true scope and spirit of the invention.

What is claimed is:

1. A synchronization circuit for providing an output sync signal which is in synchronization with an input data signal, said synchronization circuit comprising:

first sync means for acquiring synchronization with a first input signal, thereby providing a first sync signal;

second sync means for acquiring synchronization with a second input signal, thereby providing a second sync signal, wherein the second sync means includes means for maintaining a constant frequency, thereby providing a periodic signal having a predetermined stability as said second sync signal when said first sync means has not acquired synchronization to the input data signal;

means for providing said input data signal as a third input signal; and means for controlling said input signal and said sync signals such that said second sync means acquires synchronization to said first sync signal only after said first sync means acquires synchronization to said third input signal.

2. The synchronization circuit according to claim 1, wherein said first and second sync means are phase-locked loops.

3. The synchronization circuit according to claim 1, wherein said input data signal is random non-return-to-zero (NRZ) data.

4. The synchronization circuit according to claim 1, wherein said controlling means includes means for coupling said third input signal to said first input signal, for coupling said first sync signal to said second input signal, and for coupling said second sync signal to said output sync signal.

5. The synchronization circuit according to claim 1, further comprising reference means for generating a periodic reference signal having a predetermined stability.

6. The synchronization circuit according to claim 5, wherein said controlling means includes means for coupling said reference signal to said second input signal when said first sync means has not acquired synchronization to said third input signal.

7. A synchronization circuit for providing an output sync signal which is in synchronization with a received data signal, said synchronization circuit comprising:

means for determining if said received data signal is being received, thereby providing a first control signal;

first sync means for acquiring synchronization with a first input signal, thereby providing a first sync signal;

second sync means for acquiring synchronization with a second input signal, thereby providing a second sync signal, wherein the second sync means includes first interconnecting means for maintaining a constant frequency in response to said first control signal, thereby providing a periodic signal having a predetermined stability as said second sync signal when said received data signal is not being received, and wherein said first interconnecting means includes means for coupling said second sync signal to said first input signal when said received data signal is not being received;

second interconnecting means for interconnecting said received data signal, said input signals, and said sync signals, in response to said first control signal, such that said second sync means acquires synchronization to said first sync signal and said first sync means acquires synchronization to said received data signal only if said received data signal is being received; and means for providing said second sync signal as said output sync signal.

8. The synchronization circuit according to claim 7, wherein said first and second sync means are phase-locked loops.

9. The synchronization circuit according to claim 7, wherein said received data signal is random non-return-to-zero (NRZ) data.

10. The synchronization circuit according to claim 7, wherein said interconnecting means includes means for coupling said received data signal to said first input signal, and for coupling said first sync signal to said second input signal, when said received data signal is being received.

11. The synchronization circuit according to claim 7, further comprising reference means for generating a periodic reference signal having a predetermined stability.

12. The synchronization circuit according to claim 11, wherein said interconnecting means includes means for coupling said reference signal to said second input signal, and for coupling said second sync signal to said first input signal, when said received data signal is not being received.

13. A clock recovery circuit for providing an output clock signal which is in synchronization with a received input signal when the received input signal has sufficient signal strength, and which maintains continuous bit synchronization for a given period of time when the received input signal has insufficient signal strength, said clock recovery circuit comprising:

means for determining the strength of said received input signal;

threshold means for comparing the strength of said received input signal to a signal strength threshold, and for providing an indication of sufficient strength when the strength of said received input signal exceeds said threshold;

first sync means, coupled to said threshold means and said received input signal, for acquiring synchronization with said received input signal only when said received input signal has sufficient strength, thereby providing a first sync signal which is in phase and frequency synchronization with said received input signal;

second sync means, coupled to said threshold means and said first sync means, for acquiring synchronization with said first sync signal only when said received input signal has sufficient strength, thereby providing an output clock signal which is in phase and frequency synchronization with said received input signal, wherein aid second sync means includes means for maintaining a constant frequency, thereby providing a periodic signal having a predetermined stability as said second sync signal when said received input signal has insufficient signal strength, and further including means for coupling said output clock signal to said first sync means such that said first sync means acquires phase and frequency synchronization with said output clock when said received input signal has insufficient signal strength.

14. The clock recovery circuit according to claim 13, wherein said first and second sync means are phase-locked loops.

15. The clock recovery circuit according to claim 13, wherein said first sync means is an analog phase-locked loop.

16. The clock recovery circuit according to claim 13, wherein said second sync means is a digital phase-locked loop.

17. The clock recovery circuit according to claim 13, wherein said received input signal includes random non-return-to-zero (NRZ) data generated using a transmitting clock signal.

18. The clock recovery circuit according to claim 17, further including means for signal processing said received input signal so as to provide an input data signal to said first sync means, said input data signal having a periodicity representative of said transmitting clock signal.

19. A clock recovery circuit for providing an output clock signal from an input data signal, said clock recovery circuit comprising:

means for signal processing said input data signal to provide a periodic signal;

detector means for detecting the loss of periodicity of said periodic signal;

first PLL means for providing a first sync signal which is phase-locked to a first input signal;

second PLL means for providing a second sync signal which is phase-locked to a second input signal;

first switching means for connecting either said periodic signal or said second sync signal to said first input signal;

second switching means for connecting said first sync signal to said second input signal;

means for controlling said first and second switching means in response to said detector means such that said second sync signal is phase-locked to said first sync signal and said first sync signal is phase-locked to said periodic signal until the loss of periodicity of said periodic signal is detected; and means for providing said second sync signal as said output clock signal.

20. The clock recovery circuit according to claim 19, wherein said first PLL means is an analog phase-locked loop.

21. The clock recovery circuit according to claim 19, wherein said second PLL means is a digital phase-locked loop.

22. The clock recovery circuit according to claim 19, wherein said input data signal is random non-return-to-zero (NRZ) data.

23. The clock recovery circuit according to claim 19, wherein said signal processing means performs a squaring function on said input data signal.

24. The clock recovery circuit according to claim 19, wherein said second PLL means includes reference means for generating a periodic reference signal having a predetermined stability, and wherein said second switching means includes means for connecting said reference signal as said second input signal.

25. The clock recovery circuit according to claim 24, wherein said controlling means controls said switching means such that said second sync signal is phase-locked to said reference signal and said first sync signal is phase-locked to said second sync signal when the loss of periodicity of said periodic signal is detected.

26. A radio transceiver having a clock recovery circuit for providing an output clock signal which is in synchronization with a received data signal when the radio transceiver is receiving, and which maintains continuous bit synchronization for a given period of time when the radio transceiver is transmitting, said radio transceiver comprising:
   transmitter means for transmitting a radio frequency (RF) signal;
   receiver means for receiving an RF signal having a data signal modulated thereon, and for demodulating said received RF signal to provide a received data signal;
   radio controller means for controlling said transmitter means and said receiver means, and for providing a TX control signal when said radio transceiver is transmitting and an RX control signal when said radio transceiver is receiving;
   said clock recovery circuit comprising:
      first sync means for acquiring synchronization with said received data signal in response to a first mode control signal, thereby providing a first sync signal which is in phase and frequency synchronization with said received data signal;
      second sync means for acquiring synchronization with said first sync signal in response to said first mode control signal, thereby providing a second sync signal which is in phase and frequency synchronization with said first sync signal, said second sync means further including means for maintaining a constant frequency in response to a second mode control signal, thereby providing a periodic signal having a predetermined stability as said second sync signal;
      mode control means for providing said first mode control signal in response to said RX control signal, and for providing said second mode control signal in response to said TX control signal; and
      means for providing said second sync signal as said output clock signal.

27. The radio transceiver according to claim 26, wherein said first and second sync means are phase-locked loops.

28. The radio transceiver according to claim 26, wherein said first sync means is an analog phase-locked loop.

29. The radio transceiver according to claim 26, wherein said second sync means is a digital phase-locked loop.

30. The radio transceiver according to claim 26, wherein said received data signal includes random non-return-to-zero (NRZ) data.

31. The radio transceiver according to claim 26, further comprising:
   means for determining the strength of said received RF signal; and
   threshold means for comparing the strength of said received RF signal to a signal strength threshold, and for providing a fade signal when the strength of said received RF signal does not exceed said threshold.

32. The radio transceiver according to claim 31, wherein said mode control means includes means for providing said second mode control signal in response to said fade signal.

33. The radio transceiver according to claim 26, further comprising:
   means for signal processing said received data signal to provide an input data signal having a periodicity representative of the clock signal used to generate said data signal modulated on said RF signal; and
   detector means for detecting the loss of periodicity of said input data signal, thereby providing a fade signal.

34. The radio transceiver according to claim 33, wherein said mode control means includes means for providing said second mode control signal in response to said fade signal.

35. The radio transceiver according to claim 26, wherein said radio controller means controls said transmitter means and said receiver means such that they operate in a time-division multiplex radio system having predefined transmit frame times.

36. The radio transceiver according to claim 35, wherein said predetermined stability of said second sync signal is determined such that said output clock signal maintains continuous bit synchronization during said predefined transmit frame times.

37. A method of providing an output clock signal which is in continuous bit synchronization with a received random data signal, said method comprising the steps of:
   (a) receiving said random data signal;
   (b) determining the strength of said received random data signal;
   (c) signal processing said received data signal to provide an input data signal having a periodicity representative of the clock signal used to generate said random data;
   (d) acquiring phase and frequency synchronization with said input data signal in a first synchronization circuit, thereby providing a first sync signal;
   (e) comparing the determined strength of said received data signal to a signal strength threshold;
   (f) providing a loss signal when the strength of said received data signal does not exceed said threshold;
   (g) generating a periodic reference signal having a predetermined stability; and
   (h) acquiring phase and frequency synchronization with said periodic reference signal in a second synchronization circuit in response to said loss signal, thereby acquiring phase and frequency synchronization with said first sync signal in said second synchronization circuit only after said first synchronization circuit acquires synchronization with said input data signal, and providing said output clock signal.

38. The method according to claim 37, wherein said first and second synchronization circuits are phase-locked loops.

39. The method according to claim 37, further comprising the steps of:
(e) detecting the loss of periodicity of said input data signal, thereby providing a los signal;
(f) generating a periodic reference signal having a predetermined stability; and
(g) acquiring phase and frequency synchronization with said periodic reference signal in said second synchronization circuit in response to said loss signal.

40. A method of recovering a clock signal from a received data signal comprising the steps of:
(a) determining the strength of said received data signal;
(b) comparing the strength of said received data signal to a signal strength threshold;
(c) providing an indication of sufficient strength when the strength of said received data signal exceeds said threshold;
(d) acquiring synchronization with said received data signal in a first synchronization circuit only when said received data signal has sufficient strength, thereby providing a first sync signal which is in phase and frequency synchronization with said received data signal;
(e) acquiring synchronization with said first sync signal in a second synchronization circuit only when said received data signal has sufficient strength, thereby providing a second sync signal which is in phase and frequency synchronization with said first sync signal;
(f) providing said second sync signal as said recovered clock signal;
(g) generating a periodic reference signal having a predetermined stability; and
(h) acquiring phase and frequency synchronization with said periodic reference signal in said second synchronization circuit only when said received data signal has insufficient strength.

41. The method according to claim 40, wherein said first and second synchronization circuits are phase-locked loops.

42. The method according to claim 40, wherein said first synchronization circuit is an analog phase-locked loop.

43. The method according to claim 40, wherein said second synchronization circuit is a digital phase-locked loop.

44. The method according to claim 40, wherein said received data signal includes random non-return-to-zero (NRZ) data.

* * * * *

UNITED STATES PATENT AND TRADEMARK OFFICE
CERTIFICATE OF CORRECTION

PATENT NO. : 4,953,185
DATED : 08/28/90
INVENTOR(S) : Steven H. Goode

It is certified that error appears in the above-identified patent and that said Letters Patent is hereby corrected as shown below:

At column 10, line 40, "signal" should be --signals--.

At column 12, line 10, "aid" should be --said--.

At column 15, line 10, "los" should be --loss--.

Signed and Sealed this

Fifteenth Day of June, 1993

Attest:

MICHAEL K. KIRK

Attesting Officer  Acting Commissioner of Patents and Trademarks